(12) United States Patent
Waechter et al.

(10) Patent No.: US 8,731,386 B2
(45) Date of Patent: May 20, 2014

(54) ELECTRIC HEATING DEVICE FOR HEATING FLUIDS

(71) Applicants: Ralph Waechter, Pfinztal (DE);
Michael Stoerzinger, Bretten (DE);
Bernd Halbrock, Koenigsbach-Stein (DE); Alexander Dauth, Maulbronn (DE); Klaus Lehmann, Oberderdingen (DE)

(72) Inventors: Ralph Waechter, Pfinztal (DE);
Michael Stoerzinger, Bretten (DE);
Bernd Halbrock, Koenigsbach-Stein (DE); Alexander Dauth, Maulbronn (DE); Klaus Lehmann, Oberderdingen (DE)

(73) Assignee: BorgWarner BERU Systems GmbH, Ludwigsburg (DE)

( * ) Notice: Subject to any disclaimer, the term of this patent is extended or adjusted under 35 U.S.C. 154(b) by 0 days.

(21) Appl. No.: 13/629,252

(22) Filed: Sep. 27, 2012

(65) Prior Publication Data

US 2014/0086566 A1    Mar. 27, 2014

(30) Foreign Application Priority Data

Sep. 30, 2011 (DE) .......................... 10 2011 054 100
Oct. 12, 2011 (DE) .......................... 10 2011 054 406
Mar. 7, 2012 (DE) .......................... 10 2012 004 594

(51) Int. Cl.
*F24H 1/10* (2006.01)
(52) U.S. Cl.
USPC ........... 392/479; 392/483; 392/485; 392/491; 392/493
(58) Field of Classification Search
None
See application file for complete search history.

(56) References Cited

U.S. PATENT DOCUMENTS

| | | | | |
|---|---|---|---|---|
| 1,421,937 A * | 7/1922 | Goldberg | .......................... | 219/628 |
| 1,671,677 A * | 5/1928 | Keeton | .......................... | 392/489 |
| 2,640,138 A * | 5/1953 | Merritt | .......................... | 392/489 |
| 2,775,683 A * | 12/1956 | Kleist | .......................... | 392/398 |
| 3,270,182 A * | 8/1966 | Hynes | .......................... | 392/492 |
| 3,446,939 A * | 5/1969 | Lowe et al. | .................... | 392/452 |
| 3,584,194 A * | 6/1971 | Kautz et al. | .................... | 392/484 |
| 3,777,117 A * | 12/1973 | Othmer | .......................... | 392/469 |
| 3,835,294 A * | 9/1974 | Krohn et al. | ................... | 392/484 |
| 3,885,125 A * | 5/1975 | Palm et al. | ..................... | 392/466 |
| 4,286,140 A * | 8/1981 | Dewulf et al. | ................. | 392/493 |
| 4,386,261 A * | 5/1983 | Berglund et al. | .............. | 392/492 |
| 4,395,618 A * | 7/1983 | Cunningham | ................ | 392/492 |
| 4,465,922 A * | 8/1984 | Kolibas | .......................... | 392/484 |
| 5,265,318 A * | 11/1993 | Shero | ............................... | 29/447 |
| 5,438,642 A * | 8/1995 | Posen | ............................ | 392/485 |
| 5,441,710 A * | 8/1995 | Marois | ........................... | 422/307 |
| 6,289,177 B1 * | 9/2001 | Finger et al. | ................... | 392/485 |
| 6,393,212 B1 * | 5/2002 | Hutchinson | ................... | 392/491 |
| 7,286,752 B2 * | 10/2007 | Gourand | ....................... | 392/479 |

(Continued)

FOREIGN PATENT DOCUMENTS

| | | |
|---|---|---|
| DE | 195 24 683 A1 | 1/1997 |
| FR | 2 634 090 A1 | 1/1990 |
| GB | 2 298 478 A | 9/1996 |
| JP | 54 109 943 I | 8/1979 |

*Primary Examiner* — Thor Campbell
(74) *Attorney, Agent, or Firm* — Hackler Daghighian & Martino

(57) ABSTRACT

The invention relates to an electric heating device for heating fluids, comprising at least one heating rod, which has at least one heating element, a housing, which encloses the heating rod and has an inlet opening and an outlet opening, wherein the inlet opening and the outlet opening are interconnected by a winding flow channel. According to the invention, the flow channel forms a helix that has a longitudinal axis, wherein the heating rod is disposed next to the longitudinal axis of the helix and extends through a helically winding wall of the flow channel at a plurality of points.

13 Claims, 5 Drawing Sheets

(56) References Cited

U.S. PATENT DOCUMENTS

| | | | |
|---|---|---|---|
| 7,657,163 B2 * | 2/2010 | Martens | 392/470 |
| 8,028,664 B2 * | 10/2011 | Kim | 122/481 |
| 8,180,207 B2 * | 5/2012 | Shirai et al. | 392/491 |
| 8,249,437 B2 * | 8/2012 | Commette et al. | 392/484 |
| 8,515,268 B2 * | 8/2013 | Anliker | 392/497 |
| 2009/0010625 A1 * | 1/2009 | Fowler et al. | 392/397 |
| 2011/0052161 A1 | 3/2011 | Dick et al. | |

* cited by examiner

A-A

ELECTRIC HEATING DEVICE FOR HEATING FLUIDS

A problem addressed by the present invention is that of demonstrating a way to create an electric heating device for heating fluids that, in a low-cost manner, fulfills the requirements defined by vehicle manufacturers.

This problem is solved according to the invention by an electric heating device having the features set forth in claim 1. Advantageous refinements of the invention are the subject matter of dependent claims.

SUMMARY OF THE INVENTION

In a heating device according to the invention, the flow channel forms a helix comprising a longitudinal axis, wherein the heating rod is disposed alongside the longitudinal axis of the helix and at a distance to the longitudinal axis. The helix is preferably in the form of a screw, i.e. preferably has a constant pitch since this simplifies production. A consistently uniform pitch is not required, however. Per se, the flow channel can also be in the form of an irregular helix, in which the helical pitch changes between the inlet opening and the outlet opening of the heating device. According to the invention, the at least one heating rod protrudes through a helically winding wall of the flow channel at a plurality of points. If the helix is in the form of a screw, the heating rod therefore extends through the flanks of the screw. Preferably the heating rod is disposed parallel to the longitudinal axis of the helix. However, it can also form an acute angle with the longitudinal axis of the helix.

The helically winding flow channel of a heating device according to the invention results in an advantageously compact design. Since the flow channel passes by each heating rod several times, very good heat transfer is achieved. The required heat output can be easily adapted, within broad limits, to given requirements by way of the number of heating rods that are used. Advantageously, heating rods that are also common for heaters of vehicle air-conditioning systems, for example, can be used for a heating device according to the invention. This makes low-cost production possible.

According to an advantageous refinement of the invention, the flow channel is formed by flow guidance elements that are disposed one on top of the other in the housing, and each form a portion of a screw and comprise recesses for the heating rod or the heating rods. Such flow guidance elements can be inserted onto one another, for example, in order to form a flow channel having the desired length. Preferably, the flow channel is then limited by the flow guidance elements and a cylindrical circumferential wall, which encloses the flow guidance elements. Suitable flow guidance elements can be produced in a low-cost manner from a plastic, for example. It is preferable for each flow guidance element to form a turn of the screw. This results in particularly simple production. The flow guidance elements preferably form a screw having a single-start thread.

The recesses of the flow guidance elements preferably extend less further in the radial direction than the pertinent flank or wall of the flow guidance element. The recesses can be designed as holes, for example. However, the recesses can also be open toward the edge of the flow guidance element, i.e. toward the housing, and so the heating rods lie against the inner side of the housing.

When the heating rod or the heating rods lie against an inner side of the housing, a fluid to be heated flows past the heating rods on only one side. Preferably, the heating rod or heating rods are arranged such that the fluid to be heated can flow in the flow channel past the heating rod on two sides, specifically radially inwardly and radially outwardly. In other words, the heating rod therefore forms a flow obstacle that is passed radially inwardly by one portion of the flow channel and radially outwardly by a further portion of the flow channel. Particularly efficient heat transfer is attained in this manner.

According to an advantageous refinement of the invention, PTC elements are used as the heating elements, more particularly ceramic PTC elements that may be based on barium titanate, for example. Preferably each heating rod is in the form of a square tube in which at least one heating element designed as a PTC element is disposed. In such a heating rod, the heating elements are advantageously protected from the fluid to be heated by way of the square tube.

One or more PTC elements can be held in a square tube by an assembly frame that also preferably holds at least one connecting plate that protrudes from the square tube and contacts the PTC element or the PTC elements. The square tubes can be pressed after the PTC elements are installed, in order to improve the thermal conductivity. Suitable assembly frames are known from DE 10 2009 035 837 A1, for example.

According to a further advantageous refinement of the invention, the heating rods are embedded at one or both of the ends thereof in a casting compound. The casting compound can be used to seal the housing or, for example, to connect heating rods and flow guidance elements to form one easy-to-handle unit.

According to a further advantageous refinement of the invention, a flow channel section that extends in the longitudinal axis of the helix adjoins a flow channel section that forms the helix. In this manner a connecting opening, that is, the inlet opening or the outlet opening, can be disposed in a basic surface of the housing, that is, for example, in a base surface or a cover surface of a cylinder. The second connecting opening can be disposed in a jacket surface of the housing. The straight section of the flow channel in the center of the helix can thereby induce improved utilization of the heating output by way of an extension of the length of the flow channel.

Advantageously, connecting plates protruding from the heating rods can extend into slots of a circuit support plate which, for example, can be disposed in an extension or top part of a preferably cylindrical housing and can carry control electronics. Circuit support plates are often referred to as printed circuit boards or motherboards.

BRIEF DESCRIPTION OF THE DRAWINGS

Further details and advantages of the invention are explained using illustrative embodiments, with reference to the attached drawings. Components that are identical and correspond to one another are labeled therein using matching reference numerals. Shown are.

DETAILED DESCRIPTION

Figure 1:
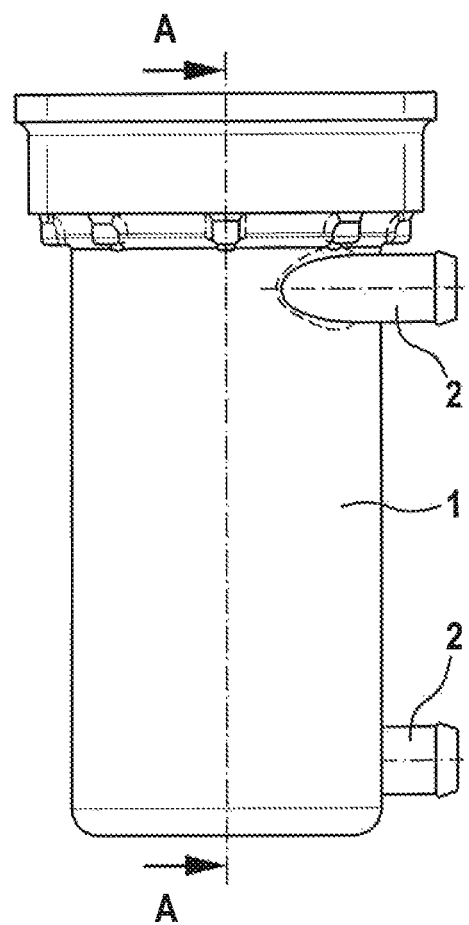
FIG. 1 an illustrative embodiment of a heating device according to the invention.
Figure 2:
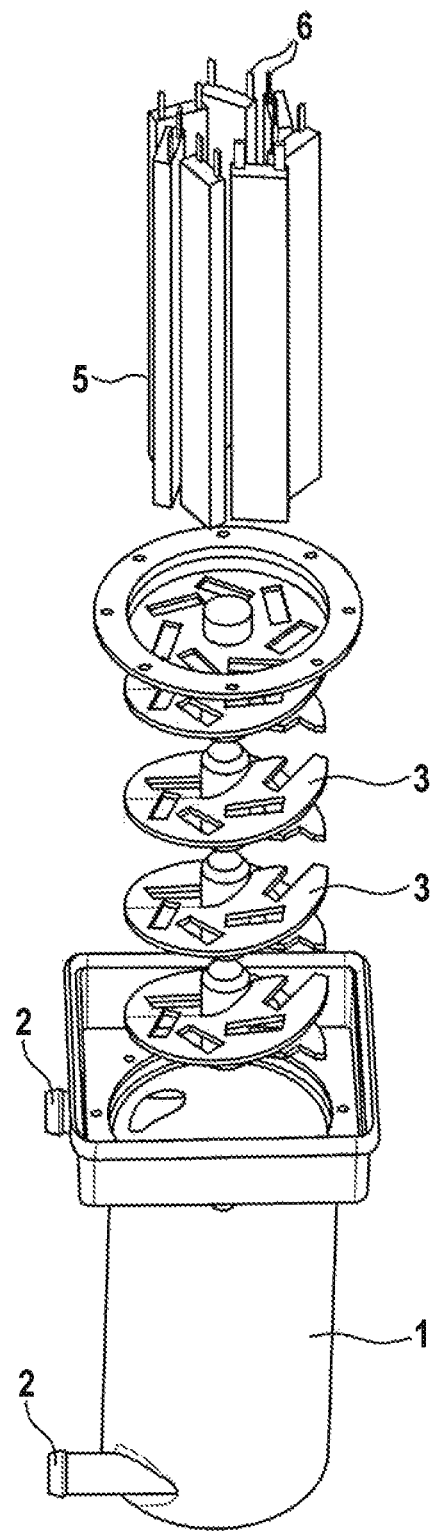
FIG. 2 an exploded view of the heating device shown in FIG. 1.
Figure 3:
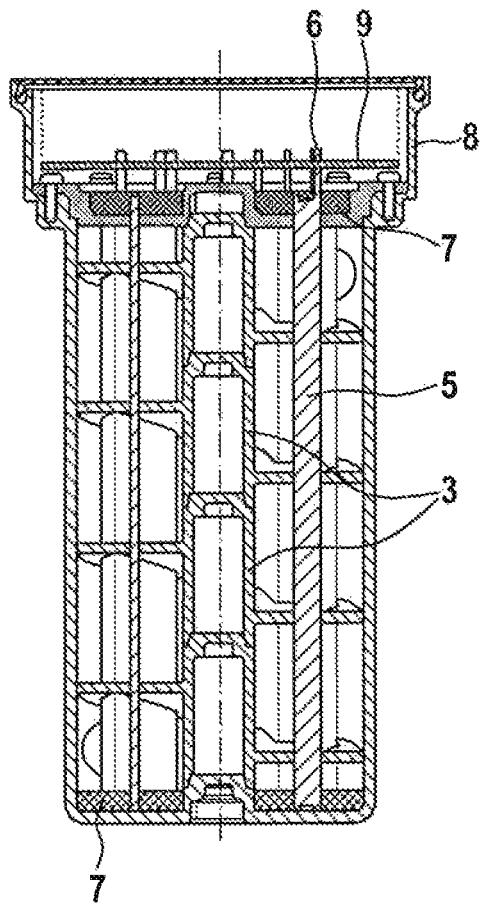
FIG. 3 a sectional view of FIG. 1.

The electric heating device depicted in FIGS. 1 to 3 is used to heat fluids in a motor vehicle, for example to heat water.

Figure 4:
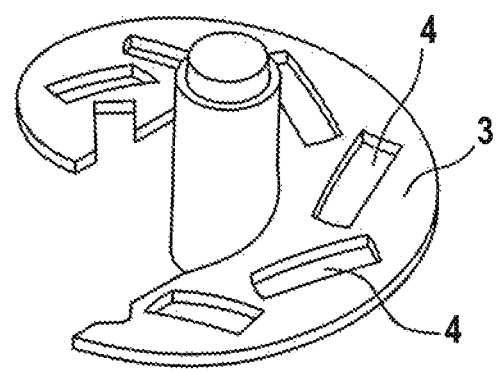
FIG. 4 a single flow guidance element from FIG. 2.
Figure 5:
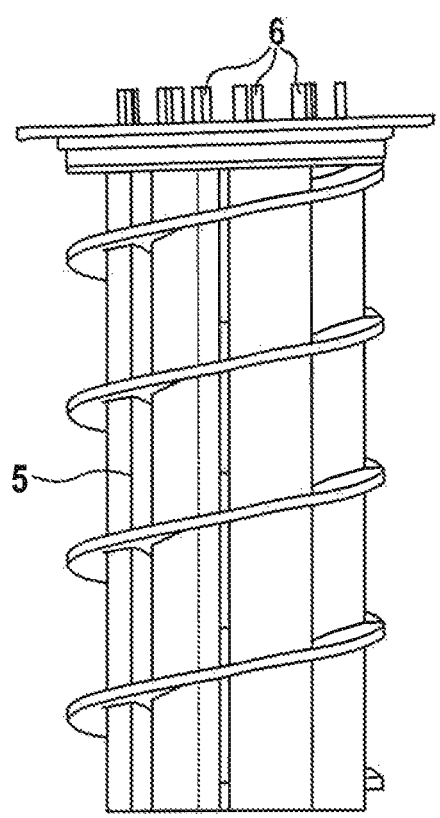
FIG. 5 the flow channel comprising heating rods without housing.

The heating device comprises a housing 1, which has two openings 2, specifically an inlet opening and an outlet opening. The inlet opening and the outlet opening are connected in the housing 1 by way of a flow channel that winds in the shape of a screw about a longitudinal axis of the cylindrical housing 1. In the illustrative embodiment shown, both openings 2 are disposed in a jacket surface of the housing 1. The course of the flow channel is defined by flow guidance elements 3, which lie on top of one another in the housing 1. Such a flow guidance element 3 is depicted in FIG. 4. FIG. 5 shows the flow guidance elements 3, which have been inserted on top of one another, and therefore shows the course of the flow channel without the housing 1.

Each of the flow guidance elements 3 forms a turn of a screw having a single-start thread. The flow channel extends between the flanks of said screw. The flanks of the screw therefore form a wall of the flow channel winding in the shape of a helix.

As shown in FIG. 4, the flow guidance elements 3 comprise recesses 4 for heating rods 5, which are depicted more particularly in FIG. 2. The heating rods 5 are disposed in the heating device next to the longitudinal axis of the screw and protrude through the helically winding wall of the flow channel at a plurality of points, specifically through the flank of each turn of the screw formed by the flow guidance elements 3.

The heating rods 5 can be in the form of square tubes in each of which a non-depicted PTC element or a plurality of PTC elements are disposed, as heating elements. The PTC elements can be held in the heating rods 5 by a not-shown assembly frame, which also holds at least one connecting plate 6 that contacts the heating elements and protrudes from the heating rod 5. If the square tube itself is used as a ground connection, a single connecting plate 6 is sufficient. Otherwise, two connecting plates 6 can be used, each of which is electrically insulated with respect to the square tube and protrudes from the heating rod 5.

The heating rods 5 preferably have a rectangular cross section having two narrow sides and two broad sides. The broad sides are preferably disposed at a slant with respect to the radial direction of the screw formed by the flow guidance elements 3. In the illustrative embodiment shown, the heating rods 5 are oriented uniformly in the circumferential direction in order to induce favorable flow conditions in the helically extending flow channel. As shown in FIG. 4, the fluid to be heated can flow around the heating rods 5 radially inwardly as well as radially outwardly.

The heating rods 5 can be embedded at one or both ends thereof in a casting compound 7, for example in order to combine the flow guidance elements 3 and the heating rods 5 into one easy-to-handle unit or to seal the housing 1. As in the illustrative embodiment shown, the housing 1 can comprise a top part 8 in which control electronics having a circuit support plate 9 are disposed. The connecting plates 6 of the heating rods 5 can extend into the top part 8, where they are inserted into slots of the circuit support plate 9. The heating rods 5 are closed at one end, for example by way of welding, bonding or crimping.

To simplify the interconnection of the flow guidance elements 3, they can comprise a peg or another raised area on a top side that fits into a matching recess on the underside of the flow guidance elements 3.

In the illustrative embodiment shown, the flow guidance channel has four turns. Therefore, four flow guidance elements 3 are disposed one above the other in the housing 1. However, the flow channel can also comprise a greater or fewer number of turns, for instance only three turns.

Figure 6:
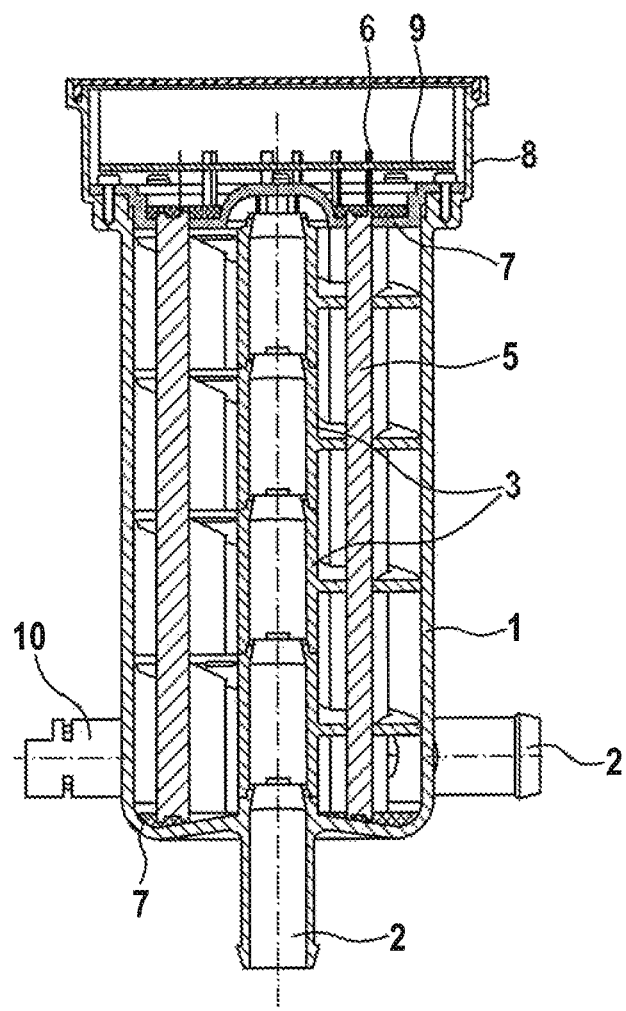
FIG. 6 a further illustrative embodiment of a heating device according to the invention, in a sectional view.

FIG. 6 shows, in a sectional view, a further illustrative embodiment of an electric heating device for heating fluids in a motor vehicle. In contrast to the illustrative embodiment described above, only one of the two openings 2 is disposed in a jacket surface of the cylindrical housing 1. The other opening 2 is disposed in a basic surface of the housing 1, for example the base or cover surface of a cylinder. It does not matter per se which of two said openings 2 is used as the inlet opening and which is used as the outlet opening. One section of the flow channel forms a helix, as in the exemplary embodiment described above. In contrast to the illustrative embodiment described above, however, said flow channel section that forms a helix is adjoined by a further flow channel section that extends in the longitudinal axis of the helix, that is, in the center of the helix.

The flow guidance elements 3 that define the course of the flow channel are therefore each designed as a tube section that carries a screw-shaped convolution on the outer side thereof. Interconnecting said flow guidance elements 3 therefore results in the formation of a helical flow channel as well as an adjoining flow channel section that extends in a straight line. The helically winding flow channel section and the straight flow channel section are connected at the end of the straight flow channel section facing away from the opening 2 disposed in the basic surface of the housing 1.

The illustrative embodiment depicted in FIG. 6 also comprises a temperature sensor 10, the connection of which can be disposed in a jacket surface of the housing 1. Such a temperature sensor 10 can also be provided in the illustrative embodiment of FIGS. 1 to 5. The temperature sensor 10 is inserted into an opening of the housing 1 that is closed by the temperature sensor 10 itself and by a seal. The temperature sensor 10 can be fixed with a splint, for example.

REFERENCE NUMERALS 1 housing
2 openings
3 flow guidance elements
4 recesses
5 heating rods
6 connecting plates
7 casting compound
8 top part
9 circuit support plate
10 temperature sensor

What is claimed is:

1. An electric heating device for heating fluids, comprising:
   at least one heating rod, which has at least one heating element;
   a housing, enclosing the heating rod and having an inlet opening and an outlet opening;
   a winding flow channel interconnecting the inlet opening and the outlet opening by a winding flow channel,
   wherein the flow channel forms a helix that has a longitudinal axis, wherein the heating rod is disposed off-center and next to the longitudinal axis of the helix and extends through a helically winding wall of the flow channel at a plurality of off-center points.

2. The heating device according to claim 1, wherein a plurality of heating rods extends through the helically winding wall of the flow channel.

3. The heating device according to claim 1, wherein the heating rod or the heating rods are disposed in parallel to the longitudinal axis of the flow channel.

4. The heating device according to claim 1, wherein the flow channel is formed by flow guidance elements that are disposed one on top of the other in the housing and each form a portion of a screw and comprise recesses for the heating rod or the heating rods.

5. The heating device according to claim 4, wherein each flow guidance element forms a turn of the screw.

6. The heating device according to claim 1, wherein the heating rod comprises a rectangular tube in which at least one heating element is disposed, said heating element being a PTC element.

7. The heating device according to claim 1, wherein the heating rod has a cross section having two narrow sides and two broad sides, wherein the broad sides are disposed at a slant with respect to the radial direction of the helix.

8. The heating device according to claim 1, wherein the housing is cylindrical.

9. The heating device according to claim 1, wherein the heating rod is embedded on at least one end in a casting compound.

10. The heating device according to claim 1, wherein a connecting plate protrudes from the heating rod and is inserted into a slot of a circuit support plate.

11. The heating device according to claim 1, wherein the flow channel comprises a section that extends in the longitudinal axis of the helix.

12. An electric heating device for heating fluids, comprising:
   at least one heating rod, which has at least one heating element;
   a housing, enclosing the at least one heating rod and having an inlet opening and an outlet opening;
   a winding flow channel interconnecting the inlet opening and the outlet opening by a winding flow channel;
   wherein the flow channel forms a helix that has a longitudinal axis, wherein the heating rod is disposed a distance from the longitudinal axis of the helix and extends through a helically winding wall of the flow channel at a plurality of points; and
   wherein the flow channel is formed by flow guidance elements that are disposed one on top of the other in the housing and each form a portion of a screw and comprise recesses for the at least one heating rod.

13. An electric heating device for heating fluids, comprising:
   at least one heating rod, which has at least one heating element;
   a housing, enclosing the at least one heating rod and having an inlet opening and an outlet opening;
   a winding flow channel interconnecting the inlet opening and the outlet opening by a winding flow channel, wherein the winding flow channel forms a helix that has a longitudinal axis, wherein the heating rod is disposed spaced from the longitudinal axis of the helix and extends through a helically winding wall of the flow channel at a plurality of points; and
   a connecting plate protruding from the at least one heating rod and inserted into a slot of a circuit support plate.

* * * * *